(12) United States Patent
Palmieri

(10) Patent No.: US 6,421,505 B1
(45) Date of Patent: Jul. 16, 2002

(54) PHOTOFLASH PROJECTION DEVICE AND A METHOD OF USING THE DEVICE

(75) Inventor: James R. Palmieri, San Antonio, TX (US)

(73) Assignee: Cody Manufacturing Company, Inc., San Antonio, TX (US)

( * ) Notice: Subject to any disclaimer, the term of this patent is extended or adjusted under 35 U.S.C. 154(b) by 0 days.

(21) Appl. No.: 09/500,311

(22) Filed: Feb. 8, 2000

(51) Int. Cl.[7] .............................................. G03B 15/05
(52) U.S. Cl. ........................ 396/200; 396/206; 396/155
(58) Field of Search ................................ 396/200, 155, 396/205, 206, 174; 362/16–18, 3

(56) References Cited

U.S. PATENT DOCUMENTS 4,078,240 A * 3/1978 Kaneko et al. ............. 396/174
4,623,824 A * 11/1986 Scolari et al. .............. 396/205
6,102,547 A * 8/2000 Matsuoto et al. ........ 396/200 X

* cited by examiner

Primary Examiner—W. B. Perkey
(74) Attorney, Agent, or Firm—Jackson Walker LLP

(57) ABSTRACT

A Photoflash Projection Device and a method of use includes a linear discharge tube in an elongated concave reflector, powered by a self-contained multiplying circuit. The reflector, having a predetermined shape to include a Natural Log Function, novelly projects and spreads a uniform light density over a wideangle/graduated depth area. This permits a user to direct light above the field's rearground to achieve the ideal photographic illumination. The flash unit further includes a support stand mounting bracket that is adjustable relative to the base of the housing. The invention is particularly suited for large Group/Commercial photography.

6 Claims, 6 Drawing Sheets

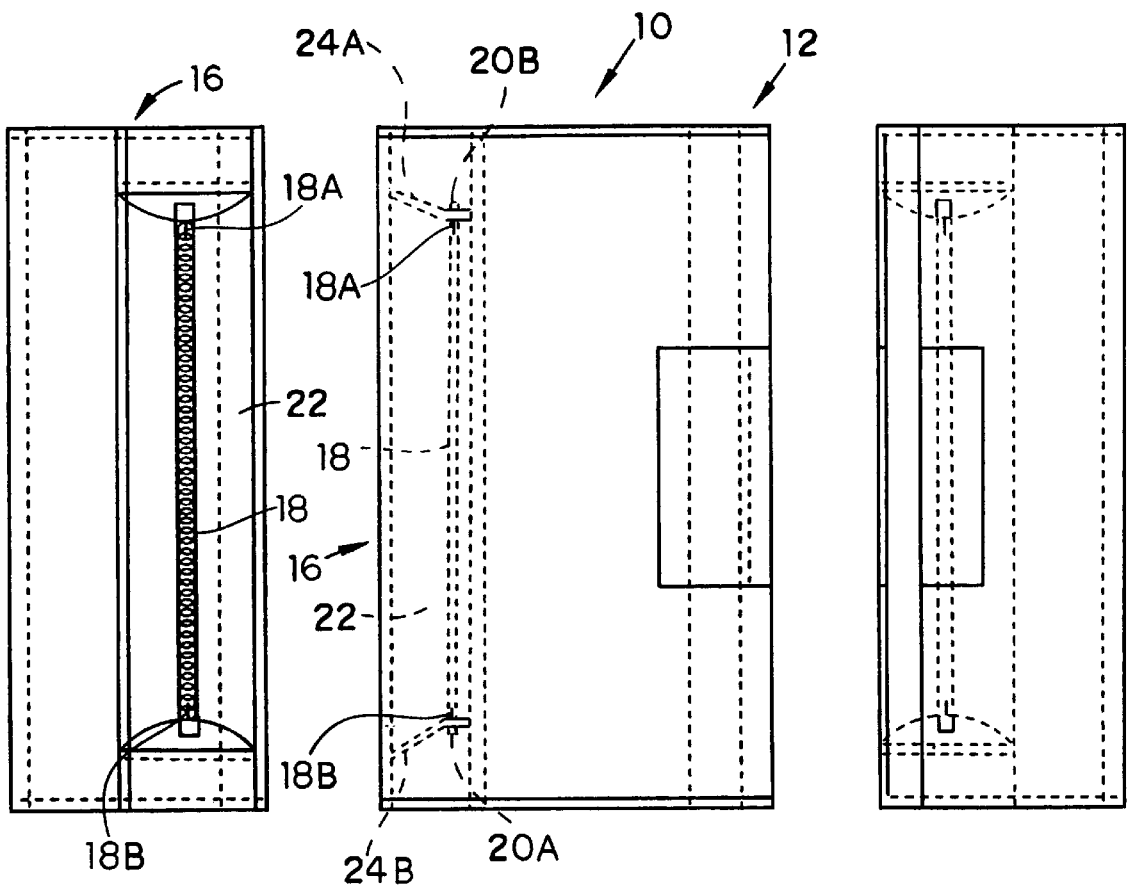
Fig. 2   Fig. 3   Fig. 4
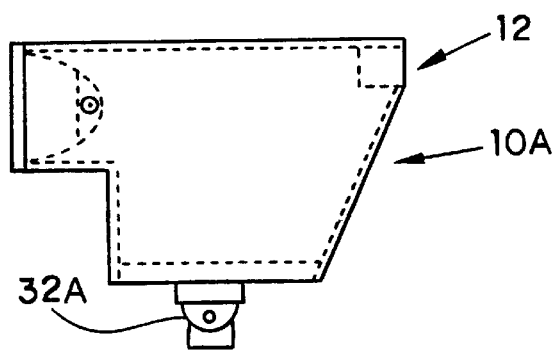
Fig. 5

PHOTOFLASH PROJECTION DEVICE AND A METHOD OF USING THE DEVICE

BACKGROUND OF THE INVENTION

1. Field of the Invention

Applicant's invention relates to photographic equipment, including flash units.

2. Background Information

Presently, flash units for cameras, especially wide angle cameras, include a bulb and a round reflector. For or group commercial photography, however, often the field of view is large and the area of illumination required by the flash is, correspondingly, large. For example, photographing large groups often requires the use of several flash units in an attempt to provide complete and full illumination of the subject of the photograph. The Group/Commercial photographer will often use several round units triggered to go off simultaneously with the release of the shutter of the camera. The present invention provides, in a single flash unit, wide angle coverage of the subject matter with superior uniform light density, even when there is a gradation of distance between a subject in the foreground and a subject in the rearground.

It is an object of the present invention to provide for a novel flash device that will provide uniform light density even over a wide angle and even where there is a gradation between a subject in the foreground and a subject in the rearground. It is another object of the present invention to reduce or eliminate shadows resulting from using one or more point source flash units.

SUMMARY OF THE INVENTION

In satisfaction of these and related objectives, the present invention provides for a rectangular flash device having a curved elongated reflector surface terminating in a pair of side reflector plates and an elongated flash discharge tube. The elongated flash tube and elongated curved reflector surface is used to provide a superior uniform light to a wide angle field.

BRIEF DESCRIPTION OF THE DRAWINGS

FIG. 2 is a front elevational view of the lamp of the present invention.

FIG. 3 is a top elevational view of the flash unit of the present invention.

FIG. 4 is rear elevational view of the flash unit of the present invention.

FIG. 5 is side elevational view of the flash unit of the present invention.

Figure 6:
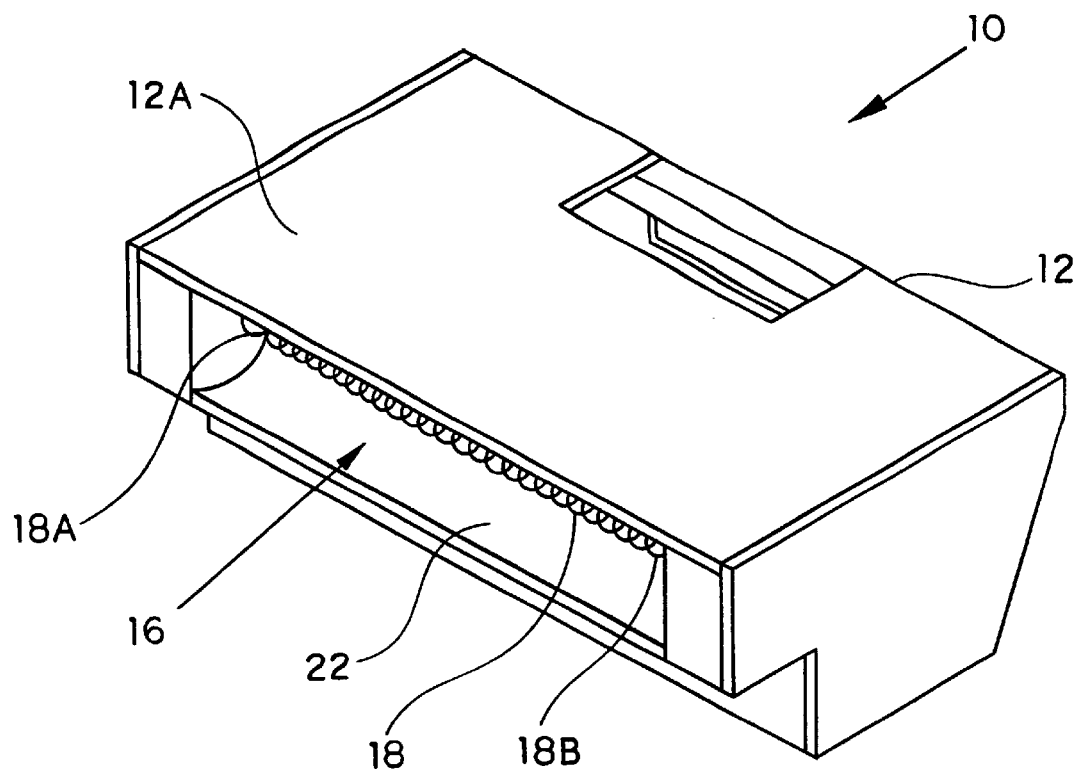
FIG. 6 is a perspective view of the present invention.

Table I represents the range of y values for given x values, as well as the formula for the preferred profile.

DETAILED DESCRIPTION OF THE PREFERRED EMBODIMENT

FIGS. 1–6 illustrate the various views of the present photographic flash device 10. More specifically it is seen that the photographic flash device 10 includes a housing 12 with an exterior surface 12A thereon. The housing is typically made of plastic or other suitable material and houses, in its interior, a multiplying circuit 14. The function of the multiplying circuit is to provide a potential difference to the photographic flash assembly 10 to discharge the flash tube. A multiplying circuit will take an input voltage and multiply it, and apply that multiplied voltage to a lamp as set forth in more detail below. A multiplying circuit for the present invention may be supplied by a number of sources.

Still with reference to FIGS. 1–6, it may be seen that the invention includes a lamp 16 incorporated into housing 12. The lamp has a cylindrical, elongated, pyrex glass flash discharge tube 18. The flash discharge tube 18 has a first end 18A and a second end 18B. The flash discharge tube 18 contains an illuminating gas 26 such as xenon. The flash discharge tube includes at the first end and second end thereof electrodes 20A and 20B that are joined to the two ends of the flash discharge tube in gas sealing relation so that the xenon gas 26 in the flash discharge tube is not contaminated by atmospheric gases. Electrodes 20A and 20B engage multiplying circuit 14 so a potential difference (voltage) is placed across the electrodes of sufficient voltage such that a flash discharge results in tube 18.

Figure 1:
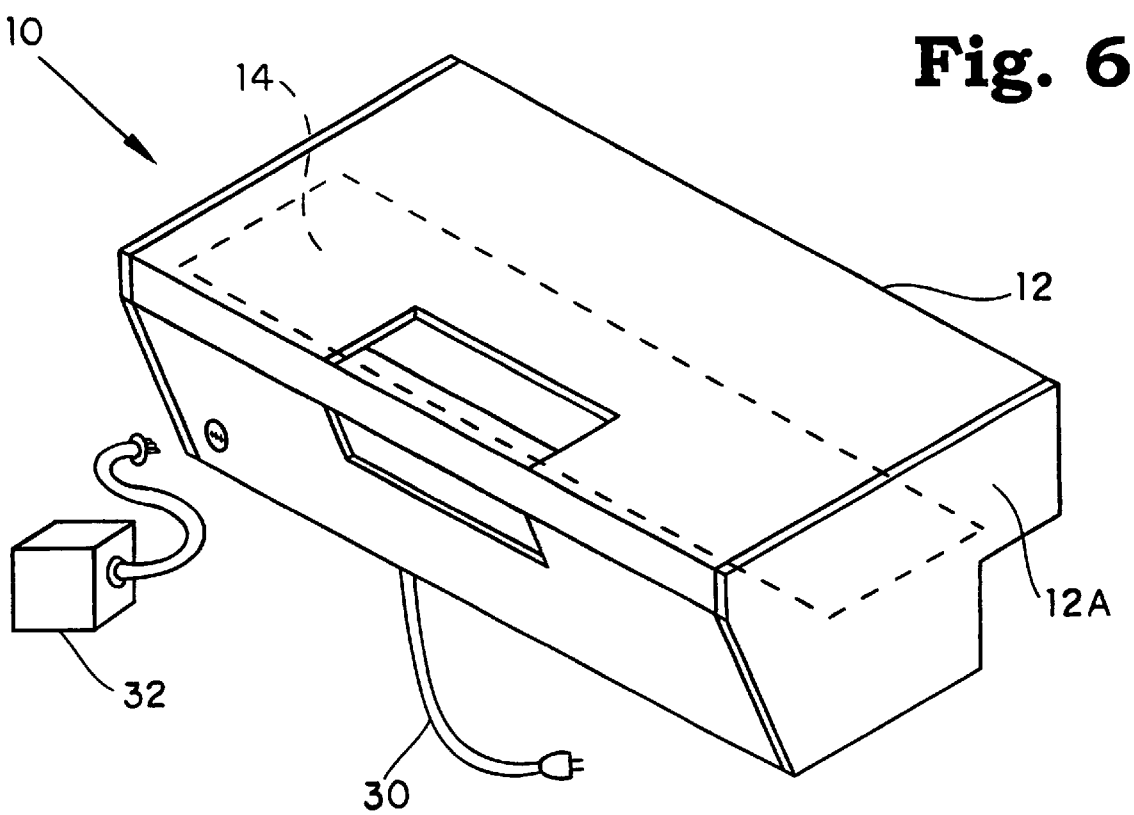
FIG. 1 is a perspective view of the preferred embodiment.

FIG. 1 also illustrates the use of a electric cord 30 for plugging in to a 110 volt AC outlet. In FIG. 5 an alternative flash assembly 10A is provided with an inverter 32 which may power the assembly 10A when there is no convenient AC outlet. Inverter 32 is available from a number of sources. FIG. 5 further illustrates a bracket 32A for a support stand to mount assembly 10A thereon so that the flash may be adjusted up and down and left to right. Bracket 32A for the present invention may be provided by Bogen, Part Number 3229/234RCL (Manfrotto).

Lamp 16 also includes reflector surface 22, which has reflector plates 24A and 24B at the removed ends thereof as seen in FIG. 3.

Figure 7:
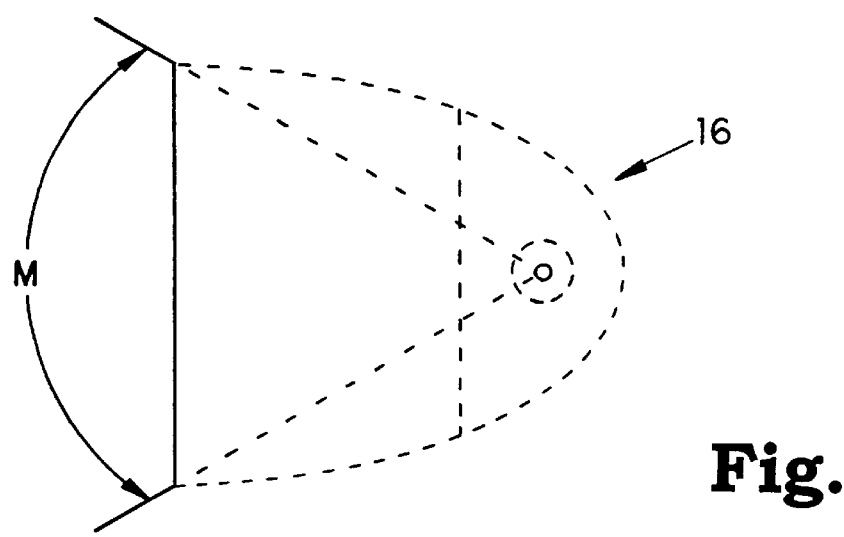
FIG. 7 is a cutaway side elevational view of the lamp of the present invention showing the profile of the reflector surface and the tube.
Figure 8:
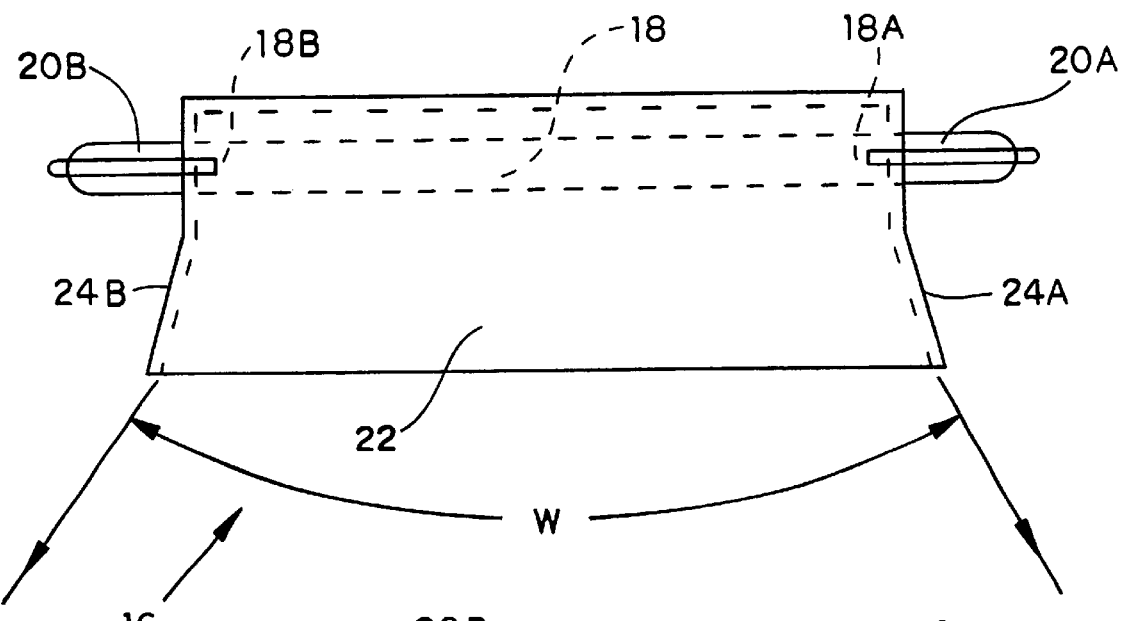
FIG. 8 is a top elevational view of the lamp of the present invention showing the flash tube and reflector surface.
Figure 9:
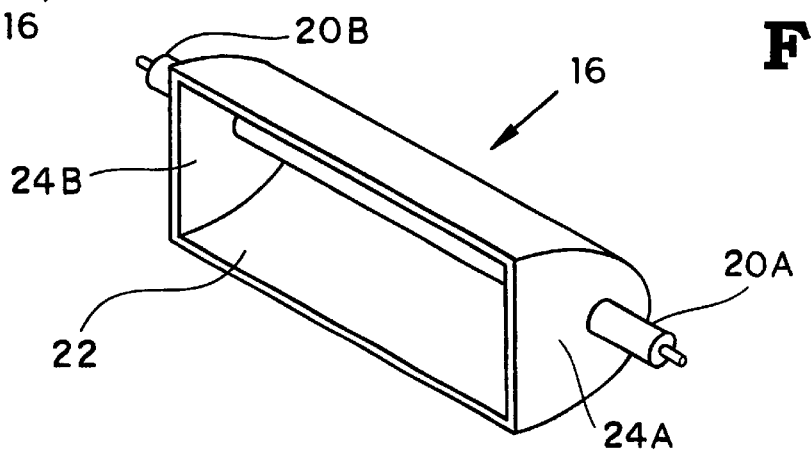
FIG. 9 is a perspective view of the lamp of the present invention.
Figures 13, 14:
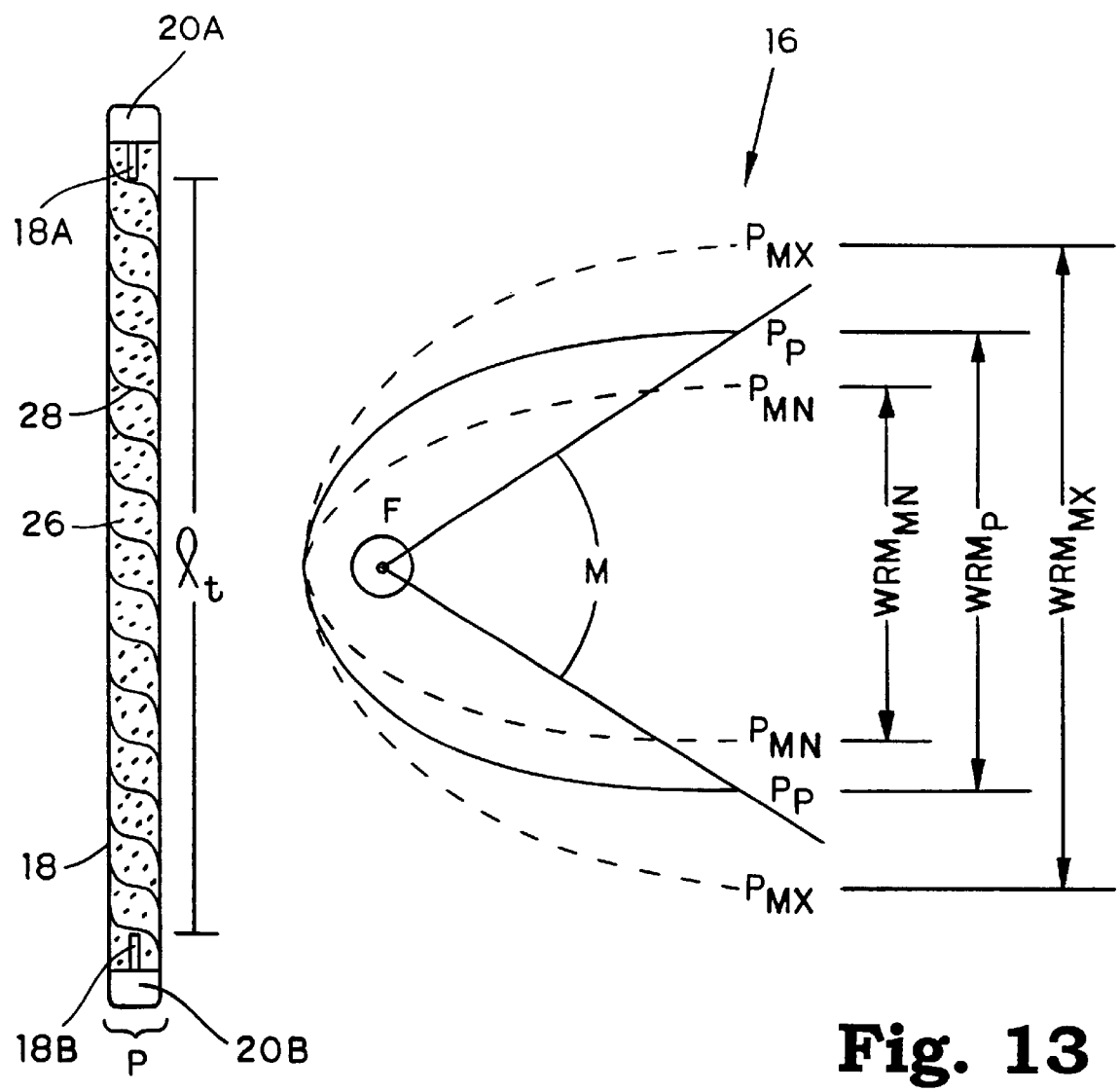
FIG. 13 is a template in side view showing preferred reflector profiles and ranges.
FIG. 14 is a top elevational view of the flash tube of the present invention.

With further reference to FIGS. 7, 8, and 13 it may be seen that the reflector surface 22 is a curved surface. Tube 18 is located along an axis perpendicular to a tangent to the apex of the curved surface (See FIG. 13). Tube 18 is elongated and maintains a fixed, constant distance from the apex of the reflector. The apex of the reflector is designated A in FIG. 11. Other measurements are designated with reference to FIGS. 7, 8, 9, 10, 11, 12 and 13. The depth of the reflector is designated DR and is a linear distance from the mouth through the apex. DR ranges between 4.5 and 10 cm, preferably 5.8 cm (see FIG. 11). TD is the distance from the apex to the center of the tube 18. TD ranges between 0.5 cm and 2.5 cm, and is preferably 1.1 cm. Further, reflector plates 24A and 24B intersect at an angle with a plane perpendicular to longitudinal axis of the tube. The angle is typically between 10° and 40° preferably 25°.

Figure 10:
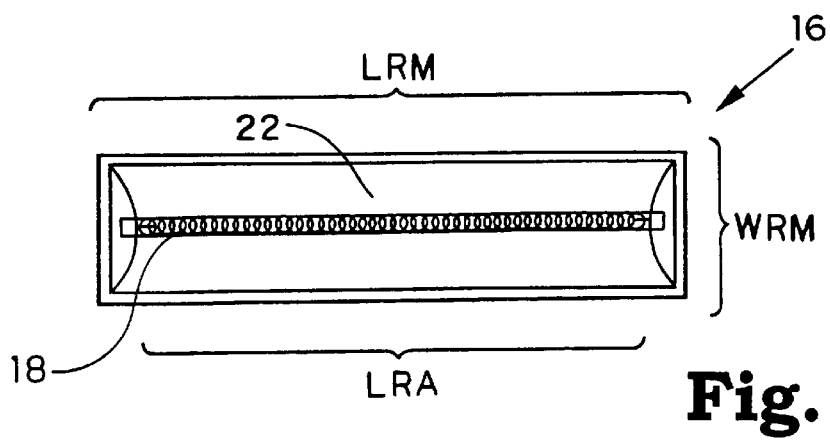
FIG. 10 is a front elevational view of the present invention showing some of the dimensions thereof.
Figure 11:
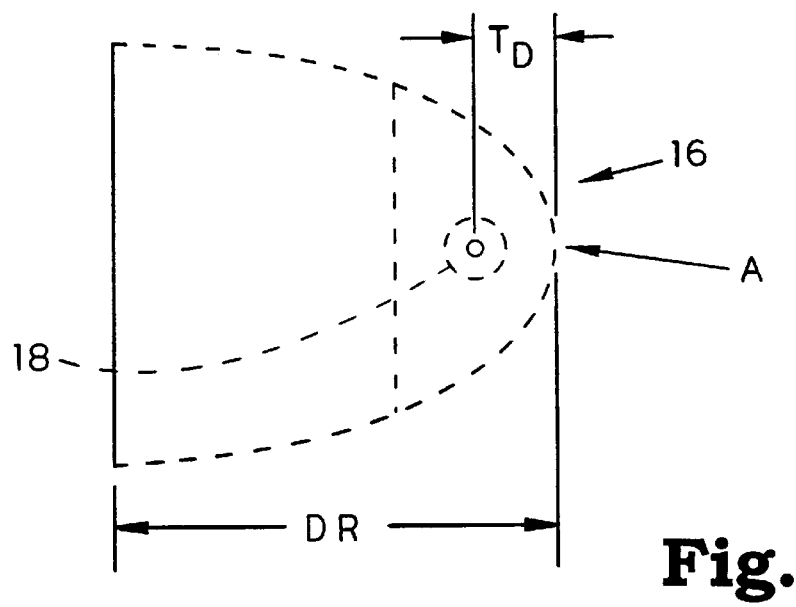
FIG. 11 is a side elevational view of the reflector and tube of the present invention showing some of the dimensions.
Figure 12:
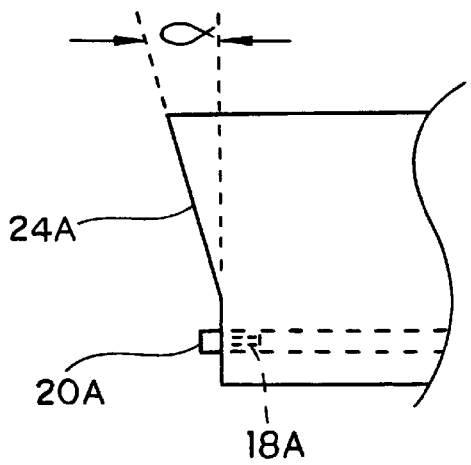
FIG. 12 is a partial top elevational view of the end of the lamp of the present invention showing the flash tube, reflector surface and the reflector walls.

FIG. 10, LRA is the length of the reflector at the apex and is typically between 24 and 45 centimeters (preferably 27.9 cm). LRM is the length of the reflector at the mouth is typically between 20 and 50 centimeters (preferably 30 cm).

FIGS. 10 and 13, illustrates the width (WRM) of the reflector at the mouth and that is typically between 5.2 and 9.2 centimeters (preferably 6.7 cm). The length of the tube between electrodes is typically 12.5 to 48.0 centimeters (preferably 26.5 cm).

In FIG. 8, W is the angle of the horizontal field or spread of the light as measured with the preferred dimensions of the reflector. This angle is preferably 65°, or in the range of 50° to 80°. In FIG. 7, M is the measured angle of the vertical field or spread of the light. This measured angle is preferably 65°, or in the range 50° to 80°.

It may also be appreciated, especially with reference to FIG. 13, that the shape of the curved profile may vary. FIG. 13 provides the exact, true to scale shape of the profile ($P_{MX}$ profile maximum, a profile minimum, $P_{MN}$ and a preferred profile $P_p$). Thus FIG. 13 is a drawing of the profile of the preferred reflector surface.

The following formula is the equation for the line defining $P_p$ in FIG. 13.

$$P_p = Y = 6.85645\ LN\ (X-6) + 0.71229795$$

The next equation is for Pmx, the line defining the profile maximum.

$$Pmx = Y = 8.982673504\ LN\ (X-6) + 2.341523267$$

Further, the last equation (Pmn) is for the line defining the profile minimum.

$$Pmn = Y = 5.57808063\ LN\ (X-6) - 1.299499251$$

Table I sets forth Y values falling within pmx and pmn at given X values. Note the origin is not at the apex for this table, which is taken from FIG. 13.

TABLE 1

| X | Y | |
|---|---|---|
| 7 | 0 | |
| 8 | ±5.4648 | 3 < Y < 10 |
| 9 | ±8.2449 | 5 < Y < 13 |
| 10 | ±10.217 | 6 < Y < 15 |
| 12 | ±12.997 | 8 < Y < 19 |
| 13 | ±14.054 | 9 < Y < 20 |
| 14 | ±14.970 | 9.5 < Y < 21 |
| 15 | ±15.700 | 10 < Y < 22 |
| 16 | ±16.500 | 11 < Y < 23 |
| 18 | ±17.750 | 12 < Y < 25 |
| 22 | ±19.722 | 14 < Y < 27 |
| 30 | ±22.502 | 17 < Y < 31 |
| 35 | ±23.800 | 19 < Y < 33 |
| 40 | ±24.891 | 19.5 < Y < 34 |
| 55 | ±27.396 | 20 < Y < 36 |

Note DX = .125 cm

FIG. 14 is an illustration of the tube 18 showing electrodes 20A and 20B and trigger wire 28 wrapped around the outer surface of the tube to help initiate the discharge when a potential difference is applied across the electrodes 20A and 20B.

Figure 15:
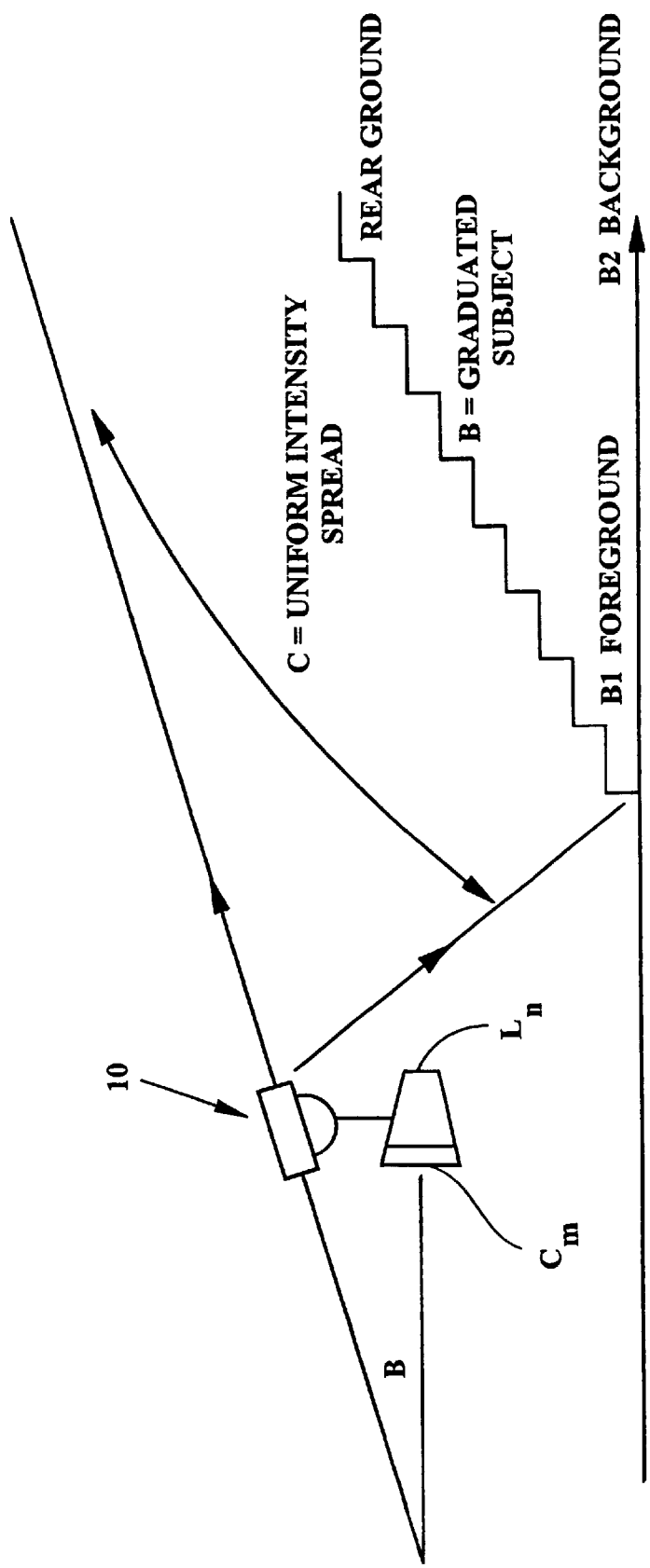
FIG. 15 is a side elevational view of a method of use of the present invention for shooting wide angle pictures.

In FIG. 15 the photoflash projection device 10 is typically mounted directly above the lens Ln of a camera Cm and is most effective when used with a camera having a wide angle lens. A wide angle lens would typically be a lens between 28 and 35 millimeter focal length and preferably 32 millimeter.

FIG. 15 illustrates how the photoflash projection device is utilized to enable the photographer to project/spread a uniform intensity of light over a wide and graduated area ranging upward from the foreground to the rearground. Example: (1) Subjects photographed on risers (from front to back) or (2) Subjects photographed from an elevated position, looking downward (from front to back). In each case the longitudinal axis running through the apex and flash tube of the photoflash device is effectively aimed approx. 10 ft. above the rearground subjects. This allows for a uniformly graduated light intensity that is most intense at the furthest point of the rearground and is less intense at the nearest point of the foreground. This achieves an ideal light spread from the high quality feathered light characteristic of the bottom half of the full vertical photoflash projection.

It has been determined that a given multiplying circuit providing 900 volts AC matched a flash discharge tube of the preferred specifications to provide peak light intensity. The multiplying circuit voltage is typically between 300 and 1000 volts. Energy output at preferred 900V multiplying circuit and preferred dimensions of tube and reflector is 800 watt-sec., with a range of 100 watt-sec to 1600 watt-sec over the preferred range of tube and reflector dimensions. The disclosed dimensions and specifications provide for a superior device for providing, especially, wide angle lighting coverage.

A reflector profile and tube constructed according to the preferred dimensions, or any set of dimensions defining the reflector profile and tube within the ranges given herein may be proportionally reduced, or expanded (to a point) (1.25, 1.50, 1.75, etc) to give effective uniform gradation but not peak lighting intensity.

Therefore it is seen that said reflector surface has a profile defining a Natural Log Function in a plane with a longitudinal axis of the reflector surface parallel to the longitudinal axis of the tube. Further it is seen the multiplying circuit provides intermittent potential difference across the electrodes of the tube to create a flash discharge. Further, it is seen that there is a range $PM_N$ to $PM_X$ for the Natural Log Function $P_p$. It is seen that the tube pressure may between 30 to 300 millimeters against atmosphere pressure and is typically 165 millimeters.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of photographing a subject with a foreground and a rearground, the method comprising the steps of:

providing a camera with a photoflash projection device comprising:

a housing defining an interior space and having an exterior surface;

a multiplying circuit for receipt into the interior space of the housing;

a lamp, the lamp for engaging the housing, the lamp comprising:

an elongated, glass, gas-filled, straight flash discharge tube having a first end and second end, the two ends engaged in gas sealing relation by two electrodes;

a reflector surface, the reflector surface adjacent and parallel to the straight flash discharge tube, the reflector surface having a profile defining a curved surface in a plane vertical to a longitudinal axis of the flash discharge tube, a curved surface with a longitudinal axis parallel to the longitudinal axis of the tube;

a pair of side reflector plates located at two removed ends of the reflector surface whereby the multiplying circuit engages the tube to intermittently apply a potential difference across the electrodes of the tube sufficient to create a flash discharge therefrom; and aiming the reflector above the rearground and beneath any bounce surface of the subject; and releasing a shutter of the camera triggering the flash discharge tube of the flash device.

2. The method of claim 1, further including:

the photograph resulting from the method.

3. The method of claim 1 further including, prior to the aiming step, the step of placing the photoflash projection device directly above the lens of the camera.

4. The method of claim 1 wherein the camera of the providing step includes a camera with a wide angle lens.

5. The method of claim 1 further including, prior to the aiming step, a step of locating a subject on risers.

6. The method of claim 1 further including, prior to the aiming step, a step of elevating the camera with respect to the subject.

* * * * *